United States Patent
Michel et al.

(10) Patent No.: US 11,458,907 B2
(45) Date of Patent: Oct. 4, 2022

(54) FASTENING DEVICE FOR AN ADJUSTABLE ACCESSORY

(71) Applicant: Ford Global Technologies, LLC, Dearborn, MI (US)

(72) Inventors: Frank Michel, Odenthal (DE); Jack Hooker, Cologne (DE); Daniel Ares Martinez, Cologne (DE); Kilian Vas, Dusseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 16/910,474

(22) Filed: Jun. 24, 2020

(65) Prior Publication Data
US 2020/0406831 A1 Dec. 31, 2020

(30) Foreign Application Priority Data
Jun. 28, 2019 (DE) .......................... 102019209556.9

(51) Int. Cl.
*B60R 11/02* (2006.01)
*H04N 5/64* (2006.01)

(52) U.S. Cl.
CPC .......... *B60R 11/0235* (2013.01); *H04N 5/64* (2013.01)

(58) Field of Classification Search
CPC ......... B60R 11/0235; B60R 2011/0087; B60R 11/0229; B60R 11/0252; B60R 2011/0005; B60R 2011/0075; B60R 2011/0085; B60R 11/02; B60R 11/0241; B60R 2011/0089; B60R 2011/0059; B60R 2011/0071; B60R 11/00; B60R 2011/0003; B60R 2011/0084; B60R 2011/0052; B60R 2011/0073; B60R 2011/0082; B60R 2011/0091; B60R 2011/0001; B60R 2011/0042; B60R 2011/0043; B60R 2011/0045;
(Continued)

(56) References Cited

U.S. PATENT DOCUMENTS 9,968,188 B1 * 5/2018 Floersch ................ F16M 13/00
10,279,645 B1 * 5/2019 Nazarian ............. B60R 11/0252
(Continued)

FOREIGN PATENT DOCUMENTS

| DE | 102009018481 A1 | 10/2010 |
|---|---|---|
| DE | 102010030964 A1 | 1/2012 |
| EP | 1910132 B1 | 11/2008 |

*Primary Examiner* — Michael E Teitelbaum
*Assistant Examiner* — Humam M Satti
(74) *Attorney, Agent, or Firm* — Vichit Chea; Price Heneveld LLP

(57) ABSTRACT

A fastening device for an adjustable display accessory in the region of the dashboard of a motor vehicle is provided. The accessory is movable into different positions relative to an operator. The fastening device pivots by a driver into an optimal position and when not in use is able to be pivoted back into a neutral position in which the driver is not disturbed, wherein at the same time the accessory may be lockable in its position such that in it maintains its set position despite vibrations. A pivoting arm which is rotatable about a fixed first axis is provided and a holder for the accessory is arranged on the free end of the pivoting arm. The holder is rotatable about a second axis provided on the pivoting arm and both the pivoting arm and the holder are lockable on their axes in a plurality of latched positions.

16 Claims, 4 Drawing Sheets

(58) Field of Classification Search
CPC ..... B60R 2011/0047; B60R 2011/0049; B60R 2011/005; B60R 2011/0061; B60R 11/0258; H04N 5/64; B60K 2370/67; B60K 35/00; B60K 37/04; B60K 2370/744; B60K 2370/81; B60K 2370/80; B60K 2370/84; F16B 5/0266; F16B 5/0628; F16M 11/06–18

See application file for complete search history.

(56) References Cited

U.S. PATENT DOCUMENTS

| | | | | |
|---|---|---|---|---|
| 2004/0247150 | A1* | 12/2004 | Iwaya | H04R 1/025 |
| | | | | 381/389 |
| 2014/0104503 | A1* | 4/2014 | Takao | H04N 5/64 |
| | | | | 348/836 |
| 2015/0028075 | A1* | 1/2015 | Khatchatrian | B60R 11/0258 |
| | | | | 224/483 |
| 2015/0329062 | A1* | 11/2015 | Ackeret | B60N 3/002 |
| | | | | 248/220.22 |
| 2016/0096485 | A1* | 4/2016 | Fan | B60R 1/04 |
| | | | | 224/570 |
| 2016/0102802 | A1* | 4/2016 | Oginski | A61B 50/20 |
| | | | | 74/527 |
| 2016/0357091 | A1* | 12/2016 | Jacobsson | F21V 21/042 |
| 2017/0232844 | A1* | 8/2017 | Sugiyama | B60K 37/04 |
| | | | | 248/27.1 |
| 2019/0037722 | A1* | 1/2019 | Maisenbacher | B60K 35/00 |

\* cited by examiner

FASTENING DEVICE FOR AN ADJUSTABLE ACCESSORY

FIELD OF THE DISCLOSURE

The present disclosure generally relates to a fastening device for an adjustable accessory, such as a display screen, and more particularly relates to a motor vehicle mounted fastening device, wherein the accessory is movable into different positions relative to the operator.

BACKGROUND OF THE DISCLOSURE

In many motor vehicles there is the need for the driver to be informed about various data via a display screen such as on an info screen and/or a tablet. In buses, for example, it is desirable that the bus driver is informed continuously about the temperature in the bus, the ventilation, the seat heating systems and the like. In refrigerated transport vehicles it is desirable that the driver is informed about the temperature in the refrigeration compartment. Various other potentially problematic situations are possible in which the driver desires to be continuously informed about the various data related to the vehicle.

To receive such displayed data, an info screen, a tablet or other display screens which are installed in the field of view of the driver are already used in vehicles. It is also already known to use adjustable holders for info screens, tablets and the like which the driver is able to set manually.

One example of an apparatus is disclosed in DE 10 2009 018 481 A1 for holding accessory elements in motor vehicles which the driver is able to set. In this apparatus, a first fastening element is arranged in a trough-shaped recess in the dashboard, a second movable fastening element for the corresponding accessory being attached thereto. In such a known apparatus, however, generally the range of movement of the accessory is significantly limited and is not able to be moved by the driver into an optimal position in every situation.

A device for fastening motor vehicle components in the vehicle interior is also disclosed in DE 10 2010 030 964 A1. This device includes a pin with a spherical attachment that serves for the fastening, and a holder for a corresponding accessory being pivotably fastened thereto. In such a fastening arrangement an advantageous adjustment of the accessory relative to the driver is also only possible to a limited extent.

A movable fastening device is disclosed in EP 1910132 B1 in which a first fastening part in the form of a suction cup is attached to a smooth surface, for example, a vehicle windscreen, while the holder for the accessory is connected to the suction cup via a ball joint. In such an arrangement an optimal adjustment of the accessory relative to the driver may not be possible.

It would be desirable to provide a fastening device for an adjustable accessory such as a display screen which may be pivoted in a convenient manner by the driver into an optimal position and when not in use may be pivoted back into a neutral position in which the driver is not disturbed. At the same time, it may be desirable that the accessory is lockable in its position such that when subjected to vibrations experienced on a vehicle the device maintains its optimal position.

SUMMARY OF THE DISCLOSURE

According to one aspect of the present disclosure, a fastening device for an adjustable accessory in a motor vehicle, the fastening device is provided. The fastening device includes a pivoting arm configured to be located in a region of a dashboard on the motor vehicle and rotatable about a fixed first axis, and a holder for holding the accessory and arranged on a free end of the pivoting arm, wherein the accessory is movable into different positions relative to an operator of the motor vehicle, and wherein the holder is rotatable about a second axis provided on the pivoting arm, and both the pivoting arm and the holder are lockable on the first and second axes in a plurality of latched positions.

According to another aspect of the present disclosure, a fastening device for an adjustable display screen on a motor vehicle, the fastening device is provided. The fastening device includes a pivoting arm which is rotatable about a fixed first axis, wherein the pivoting arm is configured to be located in a region of a dashboard of the motor vehicle, and a holder arranged on the free end of the pivoting arm and configured to hold the display screen, wherein the display screen is movable into different positions relative to an operator of the vehicle, wherein the holder is rotatable about a second axis provided on the pivoting arm, and both the pivoting arm and the holder are lockable on the first and second axes in a plurality of latched positions, wherein the first and second axes are arranged parallel to one another, wherein the first and second axes are arranged approximately vertically, and wherein the fixed first axis, about which the pivoting arm is rotatable, is fastened to the dashboard of the motor vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
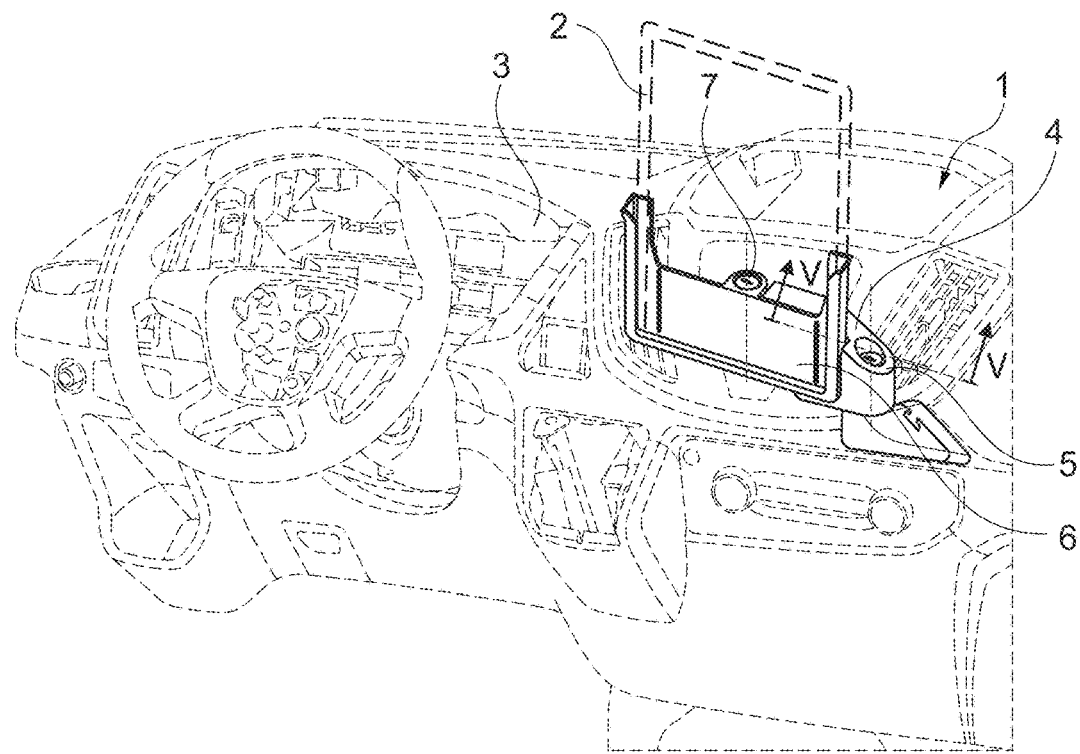
FIG. 1 is a schematic view a dashboard of a motor vehicle having a fastening device in which the holder for a display device is shown in a pivoted-back position to the right of the steering wheel.

The fastening device is shown by way of example in the drawing and described in detail hereinafter with reference to the drawing.

A fastening device 1 for an adjustable accessory 2 is shown installed in a motor vehicle in FIG. 1, according to one embodiment. The motor vehicle may be a wheeled vehicle such as a car, truck, bus, SUV, van, etc. In this embodiment, the fastening device 1 is arranged in the motor vehicle on the vehicle dashboard 3 to the right adjacent to the vehicle steering wheel. In a typical motor vehicle, an operator is seated rearward of the steering wheel to enable manual control of the steering wheel. The fastening device 1 is configured to hold an adjustable accessory 2 shown as a display screen such that the accessory 2 is movable into different positions relative to an operator.

In the exemplary embodiment shown in FIG. 1, the fastening device 1 has a pivoting arm 4 which is pivotable about a first axis 5 arranged perpendicularly and connected to the dashboard 3. The fastening device 1 also has a holder 6 for the accessory 2. The accessory 2 in the present example, is intended to be a display device such as an information (info) screen which is illustrated in FIG. 1 in dashed lines. The holder 6 is shown arranged at the free end of the pivoting arm 4. The holder 6 is rotatable about a second axis 7 provided on the pivoting arm 4 so that various possibilities are provided for adjusting the holder 6 furnished with the inserted display screen.

Figure 2:
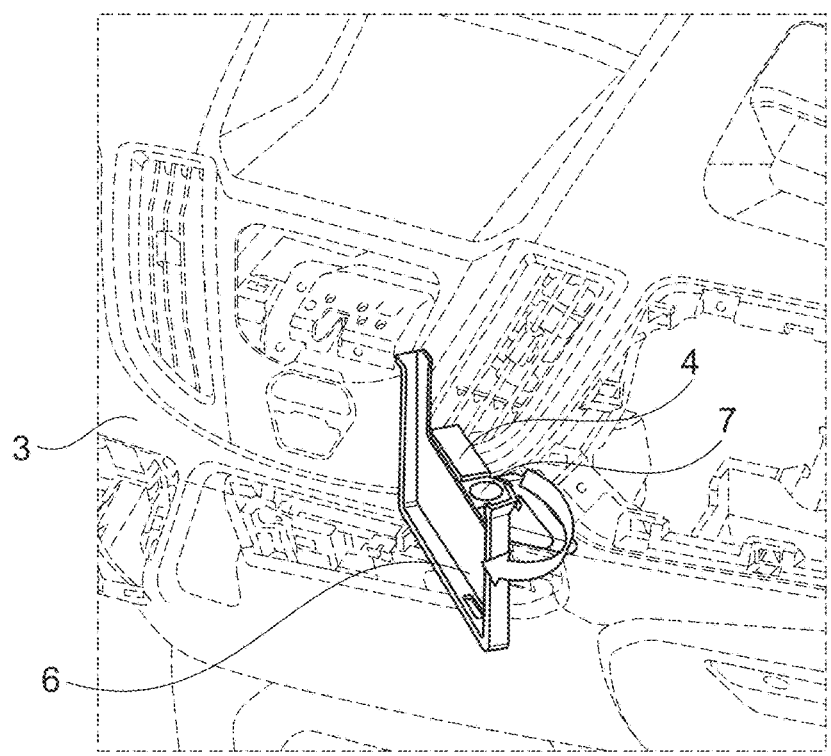
FIG. 2 is a schematic view illustrating the fastening device with the holder adjusted in the direction pivoted toward the driver.
Figure 3:
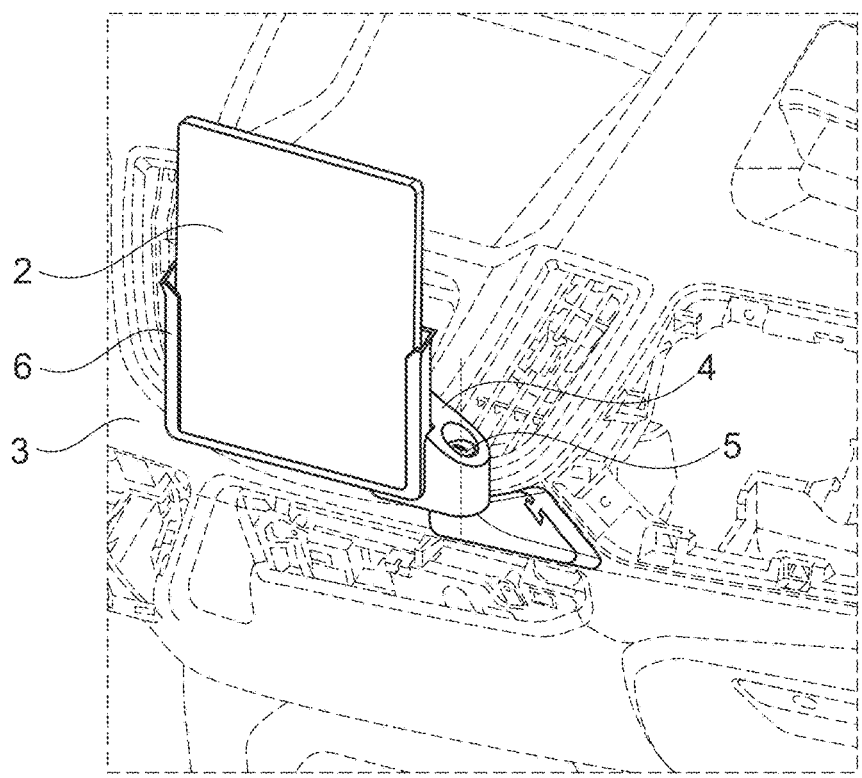
FIG. 3 is a schematic view of the fastening device showing the same position of the holder as in FIG. 1 with the inserted display screen.
Figure 4:
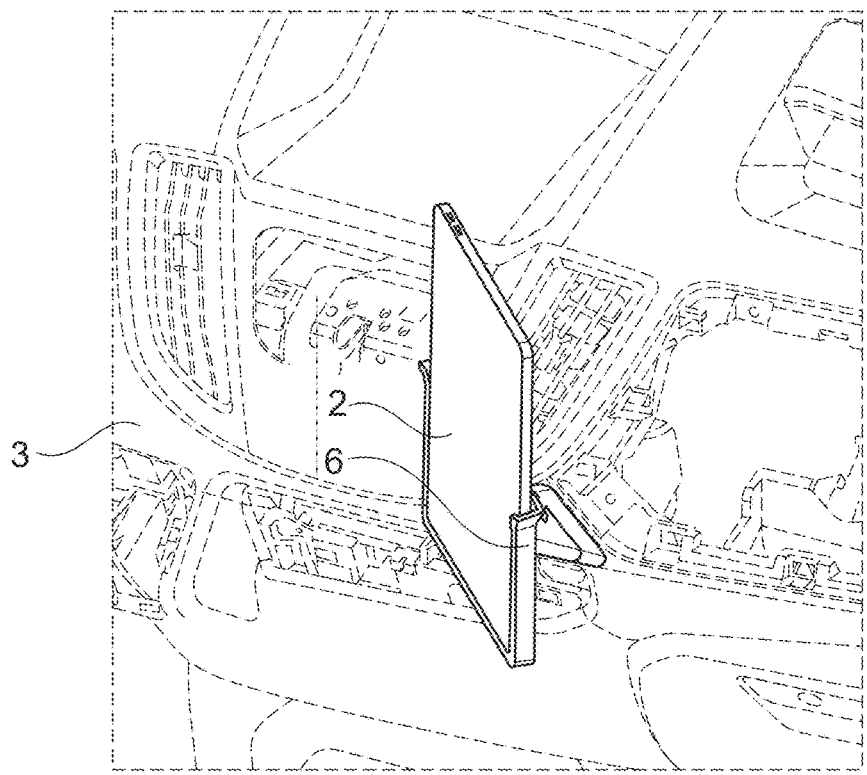
FIG. 4 is a schematic view of the fastening device showing the same position of the holder as in FIG. 2 with the inserted display screen.

The position of the holder 6 illustrated in FIG. 1 may be an inactive position in which the holder 6 is pivoted back as far as possible into a non-interfering position. In FIG. 2 the holder 6 is pivoted in the direction of the driver seated rearward of the steering wheel so that, for example, the field of view of the accessory 2 inserted into the holder 6 is clearly visible to the driver. In FIG. 3 the same position of the holder 6 is shown as in FIG. 1, wherein in this view the info screen 2 is inserted into the holder 6. The same applies to the view in FIG. 4 in which the same position of the holder 6 is shown as in FIG. 2, wherein the field of view of the accessory 2 faces the driver.

Both the pivoting arm 4 and the holder 6 are intended to be fixed in a sufficiently stable manner in the desired set position so that the accessory 2 is not displaced by an inadvertent arm movement of the driver or by vibrations, or changes in speed of the motor vehicle. To this end, the axes 5 and 7 of the pivoting arm 4 and/or the holder 6 are lockable in a plurality of latched positions. This may be achieved with a latching mechanism which is intended to stabilize the position of the holder 6 is illustrated in FIGS. 5 to 8. In the drawings, only the latching mechanism of the pivoting arm 4 is shown in this example, but the latching mechanism for the holder 6 may be configured in the same manner.

Figure 5:
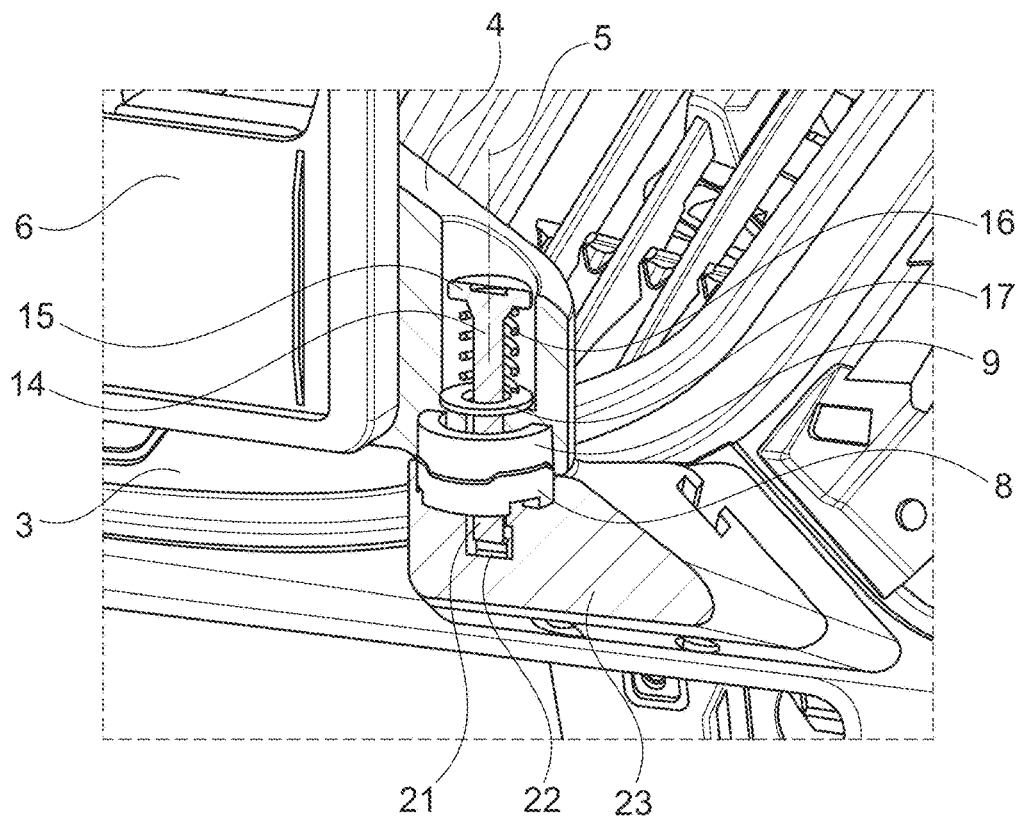
FIG. 5 is an enlarged schematic view of the fastening device showing a section along the line V-V of FIG. 1, wherein the sliding rings are latched together.

According to FIG. 5 the axis 5 of the pivoting arm 4 has two superimposed sliding rings 8 and 9, the lower sliding ring 8 thereof being secured to the dashboard 3. As may be identified, in particular, in FIGS. 7 and 8, the two sliding rings 8 and 9 have interlocking projections 10 and recesses 11 on the sliding surfaces which face one another, wherein each engagement of the projections 10 in the recesses 11 defines a specific latching position. The projections 10 and the recesses 11 are provided in the peripheral direction of the sliding rings 8 and 9 with lead-in chamfers 12 and 13, so that the pivoting arm 4 is rotatable in a stepped manner from one latching position into the next latching position.

Figure 6:
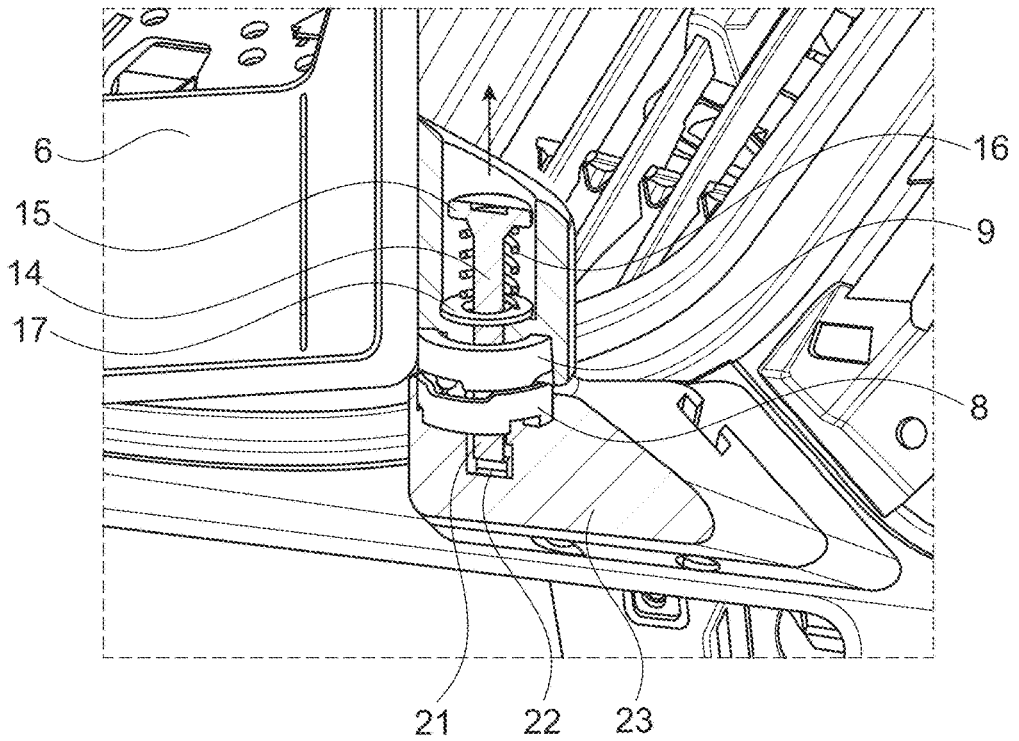
FIG. 6 is an enlarged schematic view of the fastening device showing the same section as FIG. 5, wherein the holder is slightly pivoted relative to the view in FIG. 5.
Figure 7:
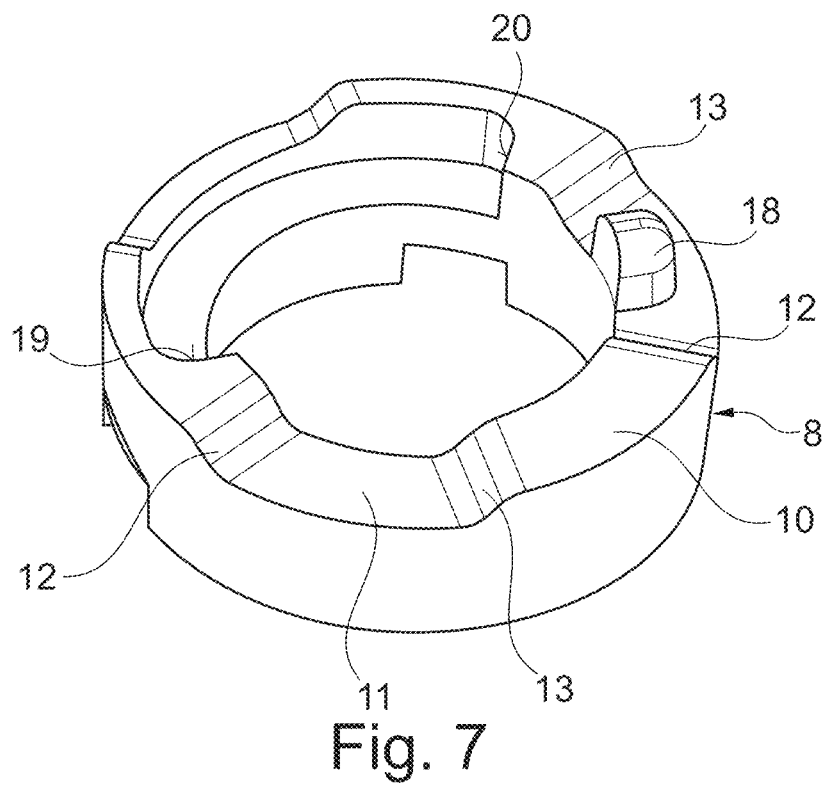
FIG. 7 is a perspective enlarged view of the lower sliding ring.
Figure 8:
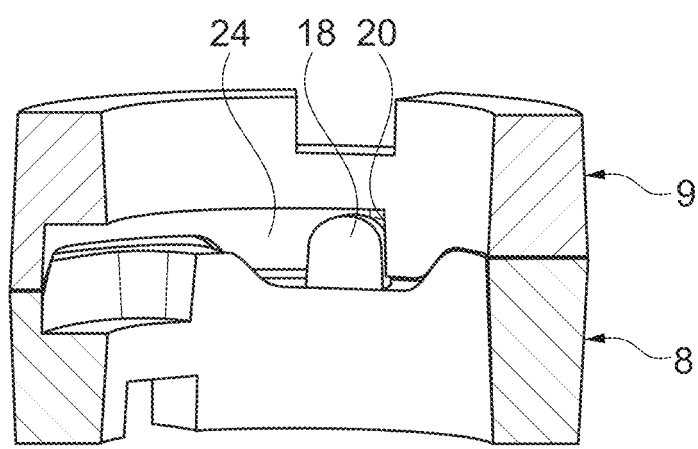
FIG. 8 is a cross-sectional view taken centrally through the two pressure rings arranged one above the other.

According to FIGS. 5 and 6 a support pin 14 which is able to be fastened to the dashboard 3 is arranged in the center of the axis 5 of the pivoting arm 4, the support pin penetrating upwardly through the sliding rings 8 and 9, and at its upper end having a widened head 15. A coil spring 16 which presses the upper sliding ring 9 against the lower sliding ring 8 is arranged between the pin head 15 and the upper face of the upper sliding ring 9. A disc-shaped sealing ring 17 which transmits the spring force of the coil spring 16 uniformly to the upper sliding ring 9 is arranged between the lower end of the coil spring 16 and the upper face of the upper sliding ring 9.

The support pin 14 has at its lower end a bayonet closure 21, the support pin being able to be fastened in a releasable and convenient manner in a receiver opening 22 provided in the dashboard 3. The receiver opening 22 may also be arranged in an add-on part 23 which is fixedly connected to the dashboard 3.

The axis 7 of the holder 6 in the present exemplary embodiment is constructed in the same manner as the axis 5 of the pivoting arm 4, wherein the support pin 14, which bears the axis of the holder 6, is connected to the free end of the pivoting arm 4. Corresponding sliding rings 8 and 9, not shown in the drawing, are also provided in the axis 7 of the holder 6, the sliding rings being subjected to pressure by use of the coil spring 16 and thus permitting the desired latching mechanism into the different latching positions. The projections 10 and recesses 11 provided in the sliding rings 8 and 9 may be selected to be of any number, depending on how many latching positions are desired.

In order to simplify the handling, a stop device is provided for limiting the pivoting angles and namely both of the pivoting arm 4 relative to the dashboard 3 and of the holder 6 relative to the pivoting arm 3. For limiting the pivoting angles, according to the embodiment shown in FIGS. 7 and 8 a stop device having a stop pin 18 is provided on at least one of the two sliding surfaces of the sliding rings 8 and 9 which face one another, and two stops 19 and 20 cooperating with the stop pin 18 are provided on the sliding surface of the other sliding ring, the spacing thereof from one another fixing the maximum pivoting angle of the two sliding rings 8 and 9 relative to one another. As may be identified in FIG. 8, in particular, the stop pin 18 which is provided on the lower sliding ring 8 engages in a lateral groove 24 of the upper sliding ring 9. The stops 19 and 20 in this case are configured at the ends of the lateral groove 24.

An advantageous fastening device 1 is therefore provided for an accessory 2 which, in particular, is advantageously employed in the interior of motor vehicles, for example for the displaceable suspension of a display device such as an info screen from which the driver is able to extract different information.

The fastening device 1 is also able to be easily retrofitted, by the aforementioned add-on part 23 being fastened to the dashboard 3 and the corresponding receiver opening 22 being provided therein for inserting the support pin 14.

According to the disclosure, a fastening device having a pivoting arm which is rotatable about a fixed first axis is provided, in that a holder for the accessory is arranged on the free end of the pivoting arm, in that the holder is rotatable about a second axis provided on the pivoting arm, and in that both the pivoting arm and the holder are lockable on their axes in a plurality of latched positions.

By use of the fastening device according to one embodiment with an accessory such as a display screen, for example an info screen or tablet, the accessory may be pivoted into many different positions which are adapted to the viewing direction of the driver in the best possible manner. Moreover, it is also possible in a simple manner to pivot the fastening device according to one embodiment, when it is not required, into a position in which it does not interfere and above all does not conceal other equipment which is intended to be visible to the driver when driving.

In order to permit an optimal pivoting range, the two pivot axes should be arranged parallel to one another and the two axes may be preferably be aligned in the vertical position. The fixed first axis, about which the pivoting arm is rotatable, is expediently fastened to the dashboard of the motor vehicle or even to an add-on part which is able to be fastened to the dashboard. In this region, the holder may be optimally pivoted into active and inactive positions.

According to one embodiment, both the pivoting arm and the holder are lockable on their axes in a plurality of latched positions so that even in the case of greater vibrations or increasing and/or decreasing speed of the motor vehicle the holder remains in the set position.

Such a stable position may preferably be achieved in that the axis of the pivoting arm has two superimposed sliding rings, the lower sliding ring thereof being connected indirectly or directly to the dashboard and the upper sliding ring thereof being connected to the pivoting arm, in that the two sliding rings are provided on the sliding surfaces which face one another with interlocking projections and recesses, wherein each engagement defines a latching position, and in that the projections and recesses are provided in the peripheral direction with lead-in chamfers so that the pivoting arm is rotatable in a stepped manner from one latching position into the next latching position. By this measure it is ensured that the holder which bears the accessory remains in a substantially stable manner in the respectively set position. On the other hand, however, it is also possible to move the holder rapidly and easily into other positions by overcoming an acceptable resistance.

A support pin which is indirectly or directly connected to the dashboard is arranged in the center of the axis of the pivoting arm, the support pin protruding upwardly through both sliding rings and at its upper end having a widened head, wherein a compression spring which presses the upper sliding ring against the lower sliding ring is arranged between the pin head and the upper face of the upper sliding ring. The compression spring is expediently configured as a coil spring which extends around the support pin and holds the sliding rings pressed against one another.

Moreover, a disc-shaped pressure ring which transmits the spring force of the coil spring uniformly to the upper sliding ring may be arranged between the lower end of the coil spring and the upper face of the upper sliding spring.

The support pin which defines the axis of the pivoting arm may be releasably connected to the dashboard in a convenient manner. In one embodiment, the support pin is provided at its lower end with a bayonet closure so that a simple and releasable connection to the dashboard and/or an add-on part provided on the dashboard is possible.

The axis of the holder may be constructed in the same manner as the axis of the pivoting arm, wherein the support pin which bears the axis of the holder is connected to the free end of the pivoting arm.

Moreover, a stop device is provided for limiting the pivoting angles both of the pivoting arm relative to the dashboard and of the holder relative to the pivoting arm. For limiting the pivoting angles, expediently a stop pin is provided on at least one of the two sliding surfaces of the sliding rings which face one another and two stop surfaces cooperating with the stop pin are provided on the sliding surface of the other sliding ring, the spacing thereof from one another fixing the maximum pivoting angle of the two sliding rings relative to one another.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fastening device for an adjustable accessory in a motor vehicle, the fastening device comprising:
   a pivoting arm configured to be located in a region of a dashboard on the motor vehicle and rotatable about a fixed first axis; and
   a holder for holding the accessory and arranged on a free end of the pivoting arm, wherein the accessory is movable into different positions relative to an operator of the motor vehicle, and wherein the holder is rotatable about a second axis provided on the pivoting arm, and both the pivoting arm and the holder are lockable on the first and second axes in a plurality of latched positions, wherein each of the first and second axes are defined by two superimposed sliding rings comprising a lower sliding ring and an upper sliding ring provided on sliding surfaces which face one another with interlocking projections and recesses, wherein the first axis of the pivoting arm has the two superimposed sliding rings, the lower sliding ring thereof being connected to the dashboard and the upper sliding ring thereof being connected to the pivoting arm, wherein the two sliding rings are provided on the sliding surfaces which face one another with interlocking projections and recesses, wherein each engagement of the projections in the recesses defines a latching position, and wherein the projections and recesses are provided in the peripheral direction with lead-in chamfers so that the pivoting arm is rotatable in a stepped manner from one latching position into the next latching position by overcoming a resistance, further comprising a support pin connected to the dashboard and arranged in the center of the axis of the pivoting arm, wherein the support pin protrudes upwardly through both sliding rings and at its upper end has a widened head, and a compression spring which pushes the upper sliding ring against the lower sliding ring is arranged between the pin head and the upper face of the upper sliding ring.

2. The fastening device according to claim 1, wherein the accessory comprises a display screen.

3. The fastening device according to claim 2, wherein the display screen is an info screen.

4. The fastening device according to claim 1, wherein the first and second a are arranged parallel to one another.

5. The fastening device according to claim 4, wherein the first and second a are arranged approximately vertically.

6. The fastening device according to claim 1, wherein the fixed first axis, about which the pivoting arm is rotatable, is fastened to the dashboard of the motor vehicle.

7. The fastening device according claim 1, wherein the compression spring is configured as a coil spring.

8. The fastening device according to claim 7, further comprising a disc-shaped pressure ring which transmits the spring force of the coil spring uniformly to the upper sliding ring arranged between the lower end of the coil spring and the upper face of the upper sliding ring.

9. The fastening device according to claim 8, wherein the support pin at its lower end has a bayonet closure for connecting to the dashboard.

10. The fastening device according to claim 9, wherein the axis of the holder is constructed in the same manner as the axis of the pivoting arm, wherein the support pin which bears the axis of the holder is connected to the free end of the pivoting arm.

11. The fastening device according to claim 10, further comprising a stop device for limiting the pivoting angles both of the pivoting arm relative to the dashboard and of the holder relative to the pivoting arm.

12. The fastening device according to claim 11, wherein the stop device comprises a stop pin provided on at least one of the two sliding surfaces of the sliding rings which face one another, and two stops cooperating with the stop pin are provided on the sliding surface of the other sliding ring, the spacing thereof from one another fixing the maximum pivoting angle of the two sliding rings relative to one another.

13. A fastening device for an adjustable display screen on a motor vehicle, the fastening device comprising:
- a pivoting arm which is rotatable about a fixed first axis, wherein the pivoting arm is configured to be located in a region of a dashboard of the motor vehicle; and
- a holder arranged on the free end of the pivoting arm and configured to hold the display screen, wherein the display screen is movable into different positions relative to an operator of the vehicle, wherein the holder is rotatable about a second axis provided on the pivoting arm, and both the pivoting arm and the holder are lockable on the first and second axes in a plurality of latched positions, wherein the first and second axes are arranged parallel to one another, wherein the first and second axes are arranged approximately vertically, and wherein the fixed first axis, about which the pivoting arm is rotatable, is fastened to the dashboard of the motor vehicle, wherein each of the first and second axes are defined by two superimposed sliding rings comprising a lower sliding ring and an upper sliding ring provided on sliding surfaces which face one another with interlocking projections and recesses, wherein the first axis of the pivoting arm has two superimposed sliding rings, the lower sliding ring thereof being connected to the dashboard and the upper sliding ring thereof being connected to the pivoting arm, wherein the two sliding rings are provided on the sliding surfaces which face one another with interlocking projections and recesses, wherein each engagement of the projections in the recesses defines a latching position, and wherein the projections and recesses are provided in the peripheral direction with lead-in chamfers so that the pivoting arm is rotatable in a stepped manner from one latching position into the next latching position by overcoming a resistance, wherein each of the first and second axes are defined by two superimposed sliding ring comprising a lower sliding ring and an upper sliding ring provided on sliding surfaces which face one another with interlocking projections and recesses, further comprising a support pin connected to the dashboard and arranged in the center of the axis of the pivoting arm, wherein the support pin protrudes upwardly through both sliding rings and at its upper end has a widened head and a compression spring which pushes the upper sliding ring against the lower sliding ring is arranged between the pin head and the upper face of the upper sliding ring wherein the compression spring is configured as a coil spring.

14. The fastening device according claim 13, further comprising a disc-shaped pressure ring which transmits the spring force of the coil sprig uniformly to the upper sliding ring arranged between the lower end of the coil spring and the upper face of the upper sliding ring.

15. The fastening device according to claim 14, wherein the support pin at its lower end has a bayonet closure for connecting to the dashboard.

16. The fastening device according to claim 13, further comprising a stop device for limiting pivoting angles both of the pivoting arm relative to the dashboard and of the holder relative to the pivoting arm, wherein the stop device comprises a stop pin provided on at least one of the two sliding surfaces of the sliding rings which face one another, and two stops cooperating with the stop pin are provided on the sliding surface of the other sliding ring, the spacing thereof from one another fixing the maximum pivoting angle of the two sliding rings relative to one another.

\* \* \* \* \*

UNITED STATES PATENT AND TRADEMARK OFFICE
CERTIFICATE OF CORRECTION

PATENT NO. : 11,458,907 B2
APPLICATION NO. : 16/910474
DATED : October 4, 2022
INVENTOR(S) : Michel et al.

It is certified that error appears in the above-identified patent and that said Letters Patent is hereby corrected as shown below:

In the Claims

Column 6:
Claim 4, Line 47;
"second a" should read --second axes--.
Claim 5, Line 49;
"second a" should read --second axes--.
Claim 7, Line 53;
After "according" insert --to--.

Column 8:
Claim 13, Line 9;
"ring" should read --rings--.
Claim 13, Line 16;
After "head" insert --,--.
Claim 13, Line 19;
After "ring" insert --,--.
Claim 14, Line 21;
After "according" insert --to--.

Signed and Sealed this
Twentieth Day of December, 2022

*Katherine Kelly Vidal*

Katherine Kelly Vidal
*Director of the United States Patent and Trademark Office*